United States Patent Office 3,180,627
Patented Apr. 27, 1965

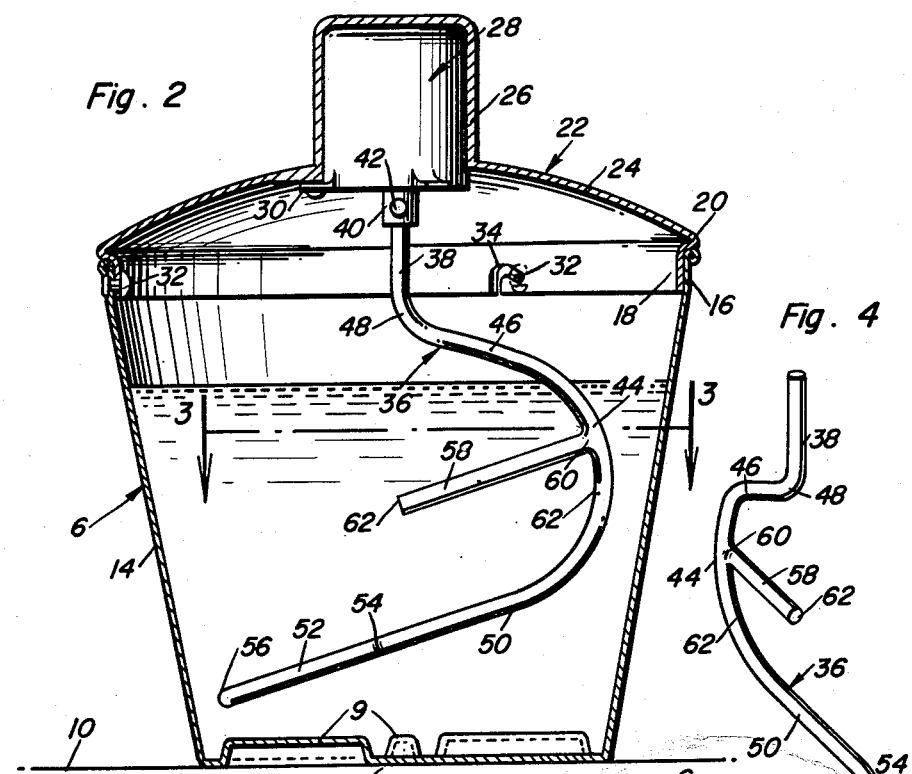

3,180,627
HOME-TYPE BREAD MIXER
Charles J. Belonga, Au Train, Mich., assignor to Olive Belonga, Au Train, Mich.
Filed Mar. 9, 1962, Ser. No. 178,647
3 Claims. (Cl. 259—107)

This invention relates to an improved portable material mixing pail which is expressly, but not necessarily, designed and structurally adapted for use in one's home for effectually mixing and kneading bread-dough, and has reference, more particularly, to an adaptation wherein the mixing and kneading unit or rod is power-driven by a motor embodied in the pail.

Briefly, the invention comprises a pail of suitable capacity for home use. A readily applicable and removable cover is provided, an electric motor being mounted on and carried by the cover. The motor, for best results, turns at between 58 and 68 r.p.m. The mixing unit or rod, which is operated by the motor, features the shape and form hereinafter described, these features being thought to be both essential and critical for reliable and efficient dough conditioning results.

A general objective is to provide a novel mixing and kneading pail which is structurally distinct, is simple and practical in construction, economical from the viewpoint of the manufacturer, may be marketed and sold to average purchasers in the low-income bracket, is susceptible to ready use and cleaning, and is otherwise appropriate and acceptable for the overall purposes it is intended to serve.

In carrying out the invention a novel pail is featured. To this end the upper end of the pail or equivalent receptacle is provided with a rim. This rim permits an annular depending flange on the bottom of a cover to fit telescopically into the pail, bayonet slot and pin connecting means being provided to separably mount the cover in place. In addition the cover is provided at its central portion with an upstanding open bottom cup-like member which provides a housing and which contains the electric motor.

A principal aspect of the concept has to do with the unique mixing and kneading unit. This comprises a simple rod of requisite stock having special cooperating component portions including a U-shaped body portion the upper limb of which is connected with a vertical motion-transmitting shaft connected with the motor. There is a lower limb having a special terminal oblique-angled extension and, in addition, a stirring and kneading prong is provided at the central portion and connected with the bight portion of the U-bend, this prong being equidistant between the limbs and oblique-angled and parallel with the corresponding oblique-angled lower limb.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a view in perspective of a home-type bread mixer constructed in accordance with the principles of the present invention;

FIGURE 2 is a view on an enlarged scale which is in section and elevation and which is taken approximately on the plane of the vertical section line 2—2 of FIGURE 1 looking in the direction of the arrows;

FIGURE 3 is a fragmentary view in section and elevation taken on the plane of the horizontal section line 3—3 of FIGURE 2; and FIGURE 4 is a view in perspective of the mixing and agitating unit referred to also as a mixing and kneading rod.

Inasmuch as the principal component parts may be readily observed with reference to FIGURE 2 it will be noted that the pail or other equivalent container is denoted generally by the numeral 6. This is constructed of appropriate non-corrosive material and is of a tapered construction shown. The capacity will usually be for approximately some eight more or less loaves of bread. It may be mentioned here that the invention may, of course, be used satisfactorily for mixing and agitating materials other than of bread-dough consistency. In any event the bottom 8 is suitably adapted to be supported on an appropriate support surface 10. In practice suitable handles or handgrips may be provided as at 12 to assist in holding the pail in a steady position when in use. It is also within the purview of the inventive concept to provide suction cups or equivalent means (not shown) to assist the user in maintaining the pail in a set position when being used. The upper open end of the wall 14 terminates in an annular flange or rim 16. This rim serves to accommodate the telescoping inwardly fitting annular flange 18 at the beaded bottom 20 of the concavo-convex lid or cover 22. The concavo-convex portion 24 is fitted with the concave side downwardly and the central apertured portion is provided with an upstanding inverted cylindrical cup-shaped member 26 which constitutes a receiver or housing for the motor 28. The motor may be fastened by lugs or the like 30. The annular flange 18 is removably secured to the rim 16 by way of bayonet slot and pin means. The pins or rivets 32 are secured to the rim and removably fitted in the bayonet slots 34.

An important aspect of the concept, considered in combination with the above features, has to do with the unique mixing and agitating rod or unit 36. This unit is constructed from round rod stock, and is of one piece construction and embodies an upper vertical end portion 38 which constitutes a shaft and which is suitably connected with the motor connection 40 as at 42. It embodies a substantially U-shaped or an equivalent body portion which is characterized by a curvate bight portion 44, and an arm or upper limb 46 which is joined by an elbow-like bend 48 to the lower end of the shaft 38. The lower limb 50 is substantially straight and assumes a diagonal angular position when in use and slants toward the bottom 8. This limb is provided at its left hand end with an extension 52 which is bent as at 54 to provide a substantially straight but laterally offset terminal, the free end 56 terminating in a plane above the bottom 8 and also adjacent to the encompassing pail wall 14. It should be noted that the bend or junctional connection 54 is to the right of the turning axis of the shaft 38. The U-shaped body portion sweeps around in an orbital path with the crest of the bight portion spaced inwardly from the interior surface of the wall 14. At points equidistant between the upper and lower limbs 46 and 50 an added stirring and kneading linearly straight prong 58 is provided, this being joined at its outer end as at 60 to the inner peripheral surface 62 of the bight portion 44. The blunt free end 62 of the prong terminates in a line which should be in approximate alignment with the axis of rotation of the shaft 38. The prong 58 slants downwardly at the approximate oblique angle shown and is parallel to the lower limb 50.

The rod and its specially bent portions aptly serve the purposes for which the same is intended and the bends are critical and have been tested to turn, for best results at between 58 and 68 r.p.m. Use of the invention has also shown that it is of such utmost simplicity in construction and use that it may be readily operated by unskilled hands following verbal instruction and without previous experience. The combination of components is safe in handling and use. The parts are also such that they may be readily repaired and cleaned.

Experience has shown that the interior of the bottom 8 should not be smooth inasmuch as the batch of dough would slide and whirl around too freely. Therefore, and to achieve best results, the bottom is provided with equidistant circumferentially spaced rectangular indentations 9. These indentations provide rib-like risers or embossments and, in conjunction with the limb 50, assure efficient mixing results.

It will be noted that the invention, considered as a unit, is self-contained in that the motor is built into the locked cover. Therefore, vibration is reduced to a minimum. Should vibration occur a slight downward pressure of the hand atop the cover will enable the user to cope therewith. Hence, there should be no need to employ clumsy and awkward-to-handle holddown clamps.

It is believed that a careful consideration of the specification in conjunction with the views of the drawing and the invention as claimed will enable persons skilled in the art to obtain a clear and comprehensive understanding of the subject matter. The features, objectives and advantageous results assured are thought to be substantially self-evident. Under these circumstances a more extensive description is thought to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitably modifications and equivalents may be resorted to, falling within the scope of the invention as claimed.

What is claimed as new is as follows:

1. An article of manufacture comprising a material mixing and kneading unit adapted to be rotated in an upright and generally cylindrical container, said article comprising a stout rigid rod having a pair of upper and lower arms disposed generally in the same vertical plane and being upwardly and downwardly inclined respectively toward one set of corresponding free end portions thereof and connected by means of an integral smoothly curved bight portion at their adjacent end portions, said arms being inclined generally the same amount relative to a horizontal plane, the free end portion of said upper arm terminating in an elongated upstanding vertical terminal end portion which is adapted to be supported for rotation about its longitudinal axis coinciding with the upstanding center axis of said container, said upstanding vertical terminal end portion being disposed in said plane, the free end portion of said lower arm extending through and beyond the longitudinal axis of said upstanding terminal end portion a distance spaced laterally outwardly of the last-mentioned axis a distance approximately equal to the distance between said last-mentioned axis and the most remote portion of said bight portion, and an elongated prong disposed in said plane, having one end portion secured to the approximate mid-point of said bight portion, and generally paralleling and projecting toward the free end portion of said lower arm, the free lower end portion of said prong terminating in general alignment with the longitudinal axis of said upstanding terminal end portion.

2. The combination of claim 1 wherein the free end portion of said lower arm defines a linearly straight terminal end extension which is slightly laterally directed relative to said plane to assume an offset oblique angle, the tip end of said extension being adapted to terminate adjacent the bottom of the generally cylindrical wall of said container in which said article is adapted to be rotated.

3. In combination, an open top receptacle for material which is to be mixed and kneaded, a cover having a depending annular flange telescopingly and removably interfitted with an annular rim flange at the top of said receptacle and releasably joined thereto by bayonet slots formed in one of said flanges and coacting pins carried by the other of said flanges, said open top receptacle including generally cylindrical side walls topped by said annular flange, a drive shaft journaled from the central portion of said cover about a vertical axis, a mixing and kneading unit defining a stout rigid rod having a pair of upper and lower arms disposed generally in the same vertical plane and being upwardly and downwardly inclined respectively toward one set of corresponding free end portions thereof and connected by means of an integral smoothly curved bight portion at their adjacent end portions, said arms being inclined generally the same amount relative to a horizontal plane, the free end portion of said upper arm terminating in an elongated upstanding vertical terminal end portion adapted to be supported from said drive shaft, in axial alignment and for rotation therewith, said upstanding vertical terminal end portion being disposed in said vertical plane, the free end portion of said lower arm extending through and beyond said axis a distance spaced laterally outwardly of the last-mentioned axis a distance approximately equal to the distance between said last-mentioned axis and the most remote portion of said bight portion, and an elongated prong disposed in said vertical plane, having one end portion secured to the approximate mid-portion of said bight portion, and generally paralleling and projecting toward the free end portion of said lower arm, the free lower end portion of said prong terminating in general alignment with the longitudinal axis of said upstanding terminal end portion, the free end portion of said lower arm defining a linearly straight terminal extension which is slightly laterally directed relative to said upstanding plane to assume an offcenter oblique angle, and the free tip end of said extension terminating adjacent the bottom of said side walls of said receptacle.

References Cited by the Examiner

UNITED STATES PATENTS

| | | | |
|---|---|---|---|
| 332,485 | 12/85 | Brown et al. | 259—108 |
| 427,861 | 5/90 | Hassenpflug | 259—108 |
| 680,229 | 8/01 | Davis | 259—107 |
| 769,193 | 9/04 | Smith. | |
| 783,085 | 2/05 | Stevens. | |
| 841,296 | 1/07 | Woodruff. | |
| 843,136 | 2/07 | Dicks. | |
| 871,988 | 11/07 | Fay. | |
| 1,157,576 | 10/15 | Nelson | 259—135 |
| 1,665,260 | 4/28 | Grunn | 259—107 |
| 2,441,941 | 5/48 | Shafter | 259—107 X |
| 2,491,952 | 12/49 | Calmes. | |
| 2,662,754 | 12/53 | Sharp | 259—125 |
| 2,810,555 | 10/57 | Rockey | 259—125 |
| 2,946,299 | 7/60 | Clifford | 259—107 X |
| 2,966,159 | 12/60 | Ruegnitz | 259—108 X |

FOREIGN PATENTS 253,946   12/48   Switzerland.

CHARLES A. WILLMUTH, *Primary Examiner.*
WALTER A. SCHEEL, *Examiner.*